United States Patent [19]

Badoche-Jacquet et al.

[11] Patent Number: 5,440,483
[45] Date of Patent: Aug. 8, 1995

[54] PROCESS AND DEVICE FOR EVALUATING THE PRECIPITATIONS OVER AN AREA OF TERRAIN

[75] Inventors: Guy Badoche-Jacquet, Vaucresson; Frédéric Blanchet; Béatrice Blanchet, both of Chatou, all of France

[73] Assignee: Rhea, Nanterre, France

[21] Appl. No.: 87,331

[22] Filed: Jul. 8, 1993

[30] Foreign Application Priority Data

Jul. 9, 1992 [FR] France ............... 92 08545

[51] Int. Cl.⁶ ............................................ G01W 1/02
[52] U.S. Cl. ............................... 364/420; 73/170.19
[58] Field of Search ................... 364/420; 73/170.20, 73/170.21, 170.22, 170.23, 170.17

[56] References Cited

U.S. PATENT DOCUMENTS

| | | | |
|---|---|---|---|
| 4,305,280 | 12/1981 | Vonnetgut et al. | 73/170.19 |
| 4,895,022 | 1/1990 | Norén | 73/170.17 |
| 5,117,359 | 5/1992 | Eccles | 364/420 |
| 5,255,190 | 10/1993 | Sznaider | 364/420 |

OTHER PUBLICATIONS

Jacquet, G. et al., "About Radar Rainfall Measurement", Fourth International Conference on Urban Storm Drainage, Ecole Polytechnique Federale, Lausanne, Suisse, pp. 25–30, Aug./Sep. 1987.
Blanchet, B. et al., "Improvement of Rainfall Measurements Due to Accurate Synchronization of Raingauges and Due to Advection Use in Calibration", Conference de Salford, Symposium on the Hydrological Application of Weather Radar, Aug. 1989.
Einfalt, Thomas, et al., "A Radar Rainfall Forecasting Method Designed for Hydrological Purposes", *Journal of Hydrology*, No. 114, pp. 229–244, 1990.
Jacquet et al., "Radar Data For Hydrological Users", Seminar on Weather Radar Networking, pp. 511–527, (1989).

*Primary Examiner*—Jack B. Harvey
*Assistant Examiner*—Xuong My Chung-Trans
*Attorney, Agent, or Firm*—Foley & Lardner

[57] ABSTRACT

Automatic rain gauges (P00-P0n) are employed within the area of terrain (ZT). A meteorological radar (R1) provides, with a given radar periodicity, a radar image representing rain-bearing cells of concern to the area of terrain. By analyzing the succession of radar images, the main rain-bearing cells are tracked dynamically by their shape and motion. Then a radar rainfall measurement chart is compiled by accumulating, in each pixel of the area of terrain, the precipitations due, during a second chosen time interval, to these main rain-bearing cells, with interpolation of their shapes and positions. At least one sub-array (PA, PB) of four rain gauges separated from one another by about 2 to 4 kilometers and affected by at least one main rain-bearing cell is selected. Finally, the rainfall measurement chart is corrected at least partially as a function of the relation between the accumulated true rainfall data and those from the said chart at the locations of the rain gauges of the sub-array. This allows excellent estimation of the precipitations in each square kilometer of the area of terrain.

10 Claims, 13 Drawing Sheets

MM/H
0.4  1.  3.  10.  20.  30.  50.  100
<

MM/H 0.4   1.   3.   10.   20.   30.   50.   100
<

MM/H
0.4    1.    3.    10.    20.    30.    50.    100
<

|  |  |  |  |  |
|---|---|---|---|---|
| R801 | 4,6 | 2,5 | 2,6 |  |
| IG02 | 3,6 | 2,5 | 2 |  |
| BR03 | 0,9 | 0,8 | 0,8 |  |
| BG04 | 2,5 | 2,2 | 1,8 |  |
| VI05 | 2,6 | 1,8 | 1,6 |  |
| DR06 | 0,8 | 0,8 | 0,8 |  |
| EC07 | 1 | 0,9 | 0,9 |  |
| LO08 | 1 | 1,4 | 0,8 |  |
| NM09 | 6,9 | 2,8 | 2,8 |  |
| DU10 | 0,6 | 0,8 | 0,8 |  |
| CL11 | 4,4 | 2,2 | 2,6 |  |
| PN12 | 0,7 | 0,7 | 0,5 |  |
| LV13 | 3,7 | 2,4 | 2 |  |
| NC14 | 5,2 | 3,1 | 3,2 |  |
| BM15 | 0,8 | 0,7 | 0,7 |  |
| NP16 | 5,2 | 2,5 | 2,6 |  |
| NE17 | 6,4 | 2,1 | 2,6 |  |
| PM18 | 1,8 | 1,6 | 1,3 |  |
| MT19 | 5,2 | 1,9 | 1,8 |  |
| AM20 | 3,6 | 1,4 | 1,1 |  |
| MO21 | 0,4 | 0,8 | 0,8 |  |
| OU22 | 0,6 | 0,5 | 0,5 |  |
| TF23 | 3,2 | 2,1 | 2,1 |  |

PROCESS AND DEVICE FOR EVALUATING THE PRECIPITATIONS OVER AN AREA OF TERRAIN

The invention relates to rainfall measurement.

A primeval phenomenon, today rain is still difficult to quantify. Of course, rain gauges capable of measuring the quantity of rainwater received at a specific point are employed. So-called meteorological radars capable of tagging rain-bearing formations and allowing estimation of the precipitations due to them are also employed. The difficulty is to determine as precisely as possible the quantity of water which falls on each square kilometer of a fairly extensive area of terrain (typically several tens to several thousands of km$^2$).

The fairly complex characteristics of rain-bearing formations, their motions and their ability to turn into rain mean that the precise volume of the precipitations which fall on each km$^2$ of fairly extensive areas of terrain are poorly known unless they are carpeted with rain gauges, something which is obviously not generally applicable.

Now, it is important to know accurately the quantities of rainwater having fallen in a few minutes on each km$^2$ of fairly extensive areas of terrain. In a rural area this may for example make it possible to forecast excessive runoffs; the latter create erosion and engender leaching of fertilizers and pesticides, destruction of crops, or worse, torrential floods.

In an urban area, accurate knowledge of the intensity of precipitations is useful for managing water drainage and for avoiding untimely flooding or pollution.

This situation of ignorance about precipitations persists, although numerous studies have been carried out:

"Intérêt technique et économie des radars d'investigation des précipitations en matiére d'assainissement urbain", (Technical and economic attraction of radars for investigating precipitations with reference to urban reclamation), G. JACQUET, Session No. 123, Comité technique de la Société Hydrotechnique de France, (Technical Committee of the Hydrotechnical Society of France), La Houille Blanche No. 5/6, 15 Jun. 1983;

"Premiers résultats de l'expérience Radar RODIN sur les départements du Val-de-Marne et de Seine-Saint-Denis", (First results from the RODIN radar experiment in the Val-de-Marne and Seine-Saint-Denis regions), G. JACQUET, H. ANDRIEU, Session No. 123, Comité technique de la Société Hydrotechnique de France, La Houille Blanche No. 5/6, 16 Jun. 1983;

"About radar rainfall measurement", H. ANDRIEU, T. DENOEUX, G. JACQUET, Proceedings of IVth Int. Conference on urban storm drainage, École Polytechnigue Fédérale—Lausanne —SWITZERLAND, pp. 25-30, 31/8–4/9 1987;

"Improvement on Rainfall Measurements due to accurate synchronisation of raingauges and due to advection use in calibration", B. BLANCHET, A. NEUMANN, G. JACQUET, H. ANDRIEU, Salford Conference, Symposium on the hydrological application of weather radar, August 1989;

"Radar data for Hydrological Users" J CHEZE, G JACQUET, Seminar on Weather Radar Networking, Brussels, 5-8 September 1989;

"A radar Rainfall Forecasting Method Designed for Hydrological Purposes", T. EINFALT, T. DENOEUX, G. JACQUET, Journal of Hydrology, 114, pp. 229-244, 1990.

A recent point was made in the collection of communications presented in the "Proceedings of the 25th International Conference on radar meteorology of the American Meteorology Society", Jun. 24-28, 1991, PARIS, FRANCE.

It is under these conditions that the present invention shall provide means allowing, for the first time, truly satisfactory evaluation of the precipitations over an area of terrain.

The process proposed to this end comprises the combination of the following steps:

a) automatic rain gauges are employed within the area of terrain, and are able to provide dated local rainfall data accumulated over a first chosen time interval, these rain gauges being synchronized to within about one minute, b) there is provision for a meteorological radar able to provide, with a given radar periodicity, a radar image representing rain-bearing cells over a radar workspace which encompasses the said area of terrain, the pixels of the radar image being sampled over preferably at least 8 reflectivity levels, included between about 25 dBZ and about 56 dBZ, c) inside the area of terrain, the succession of radar images is analyzed so as to track the main rain-bearing cells dynamically by their shape and motion, d) a radar rainfall measurement chart is compiled by accumulating, in each pixel of the said area of terrain, precipitations due, during a second chosen time interval, to these main rain-bearing cells, with interpolation of the shapes and positions of the main rain-bearing cells during this second time interval, e) at least one sub-array of at least four rain gauges separated from one another by about 2 to 4 kilometers and affected by at least one main rain-bearing cell, is selected from the rain gauges, and f) the rainfall measurement chart is corrected at least partially as a function of the relation between the accumulated true rainfall data from the rain gauges of the sub-array and those from the said chart at the locations of the rain gauges of the sub-array, taking into account the ratio between the first and second time intervals.

This allows excellent estimation of the precipitations in each square kilometer of the area of terrain.

Very advantageously, the radar periodicity is at most equal to about 6 minutes; the duration of the first time interval is at most equal to about 6 minutes; the duration of the second time interval is at most equal to about 30 minutes.

According to another aspect of the invention, the operation c) comprises, before analysis, an operation c1) for processing ground echoes, including:

c11) a global preanalysis of the radar image in order to determine whether it relates to dry or rainy weather, c12) the updating of a radar ground echo chart if the weather is dry, and c13) if the weather is rainy, the replacing of the points belonging to the radar ground echo chart by pixels extrapolated from previous images.

According to yet another aspect of the invention, the operation c) comprises:

c2) the searching of the current image for main rain-bearing cells, in the form of blocks of pixels satisfying a chosen condition on level, with fitting of these main rain-bearing cells with those from previous images, for the dynamic tracking of their shape and motion, as well as c3) the determination of an average motion of the pixels outside the rain-bearing cells in the current image, with respect to at least one previous image, and in that step d) comprises:

d1) the estimation of the accumulated precipitations due to the main rain-bearing cells as a function of the levels of their interpolated pixels, taking into account the actual speed of each cell, and d2) the estimation of the accumulated precipitations due to the pixels situated outside the rain-bearing cells, as a function of their level, taking into account their average motion.

Of course, the invention extends to the devices for implementing this process, in its different variants.

Other characteristics and advantages of the invention will emerge on examining the detailed description below and the attached drawings, in which.

The attached drawings are in essence of certain character. They therefore form an integral part of the description. Likewise for the publication [sic] cited therein. As a consequence, these elements will be able not only to serve to better elucidate the invention, but also to contribute to its definition.

Figure 1:
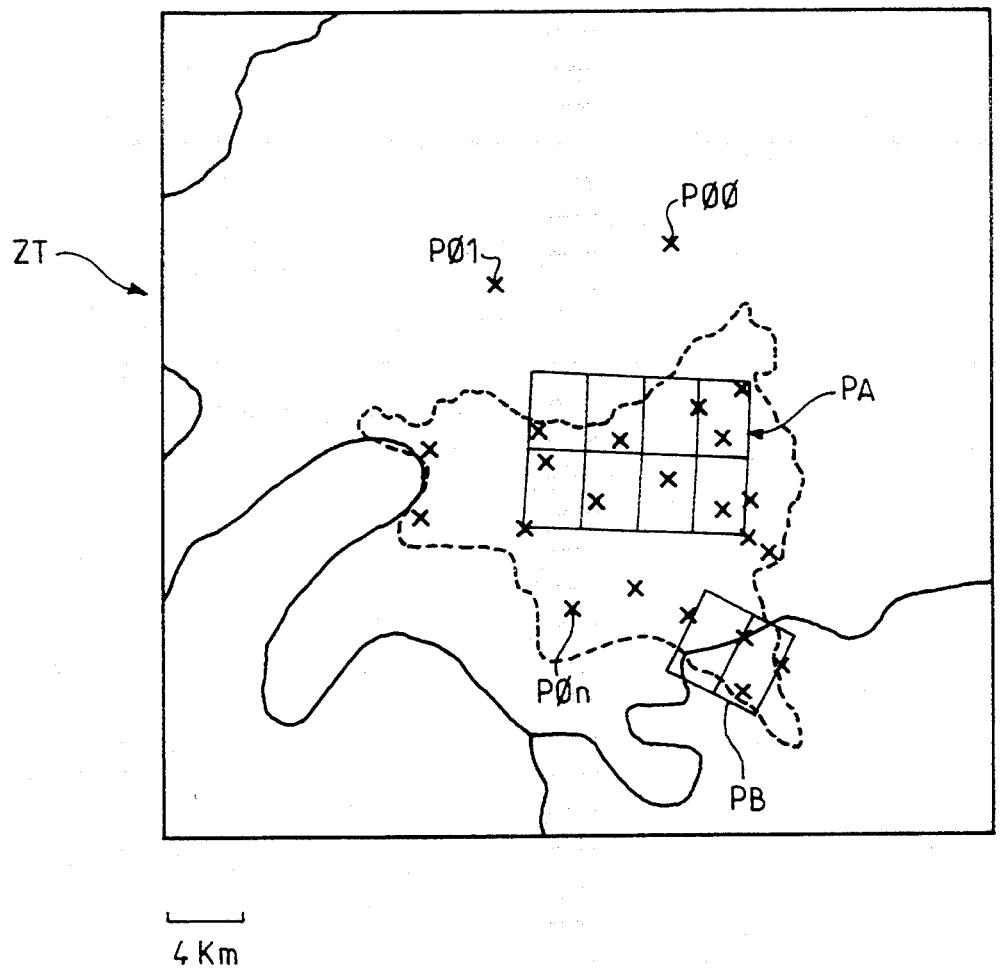
FIG. 1 illustrates diagrammatically an area of terrain of about 1000 km², monitored by a radar, and over which are installed rain gauges diagrammatically represented by "x"s.
Figure 1:

FIG. 1 illustrates a chart of an area of terrain ZT, with summary indications of a geographical nature. The area is observed by a radar R1 whose position is shown diagrammatically to the bottom left of the figure. The crosses ("x") indicate the position of rain gauges (or rain recorders) P00, P01.. P0n.

The radar R1 is a meteorological (or hydrological) radar, such as the models:

MELODI from the OMERA company (Argenteuil, France),

RODIN from the THOMSON company (Paris, France),

WRS 74C, WRS 74S, WRS 81C, WRS 81S from the ENTERPRISE ELECTRONICS CORP. company (Alabama, United States), NEXRAD from the UNISYS company (United States).

Other usable radars are indicated in the Report of the Radar Working Group of the Commission on Instruments and Methods of Observation of the World Meteorological Organization.

Preferably, a pulsed radar is used, possibly capable of selective reception of echoes as a function of their polarization.

The working wavelength of the radar is between around 5 and 10 centimeters, for most applications. The radar sweeps the area which surrounds it by scanning at a tempo of a few minutes. Typically, it is preferable here for the tempo to be for example one revolution every 72 seconds. The tempo of the pulses is about 300 hertz, for a pulse duration of about 1 microsecond, this corresponding to a resolution of about 150 meters in radial distance (the expression radial distance designates the distance from a point of the terrain to the radar).

The radar R1 observes with small elevation, and with a narrow beam.

Typically, the half-vertex angle of the beam is 1.2° for the main lobe of the antenna, taken at 3 decibels. A radar image is defined with the aid of one or more angular scans, each with constant elevation. The elevation can be:

about 0.6° (small elevation);
about 1.5° (average elevation);
about 2.0° (large elevation).

Of course, the value or values of the elevation may be modified as a function of the relief of the processed area: flat or hilly, in particular, or else of the size of the work area.

Those skilled in the art will know that it is thus possible to obtain a radar image whose elementary points or pixels measure about 1 km × 1 km, for radial distances below about one hundred kilometers.

Although the interaction of the radar beam and the rain-bearing formations is extremely complex, it is generally considered that the back-scattering of the radar wave by these rain-bearing formations is expressed by a radar reflectivity factor customarily denoted Z, which itself depends on the sixth power of the diameter of the water drops.

Those skilled in the art will deduce from this, as a first approximation, that the back-scattered power $P_r$ recovered in the receiving units of the radar is proportional to this radar reflectivity factor Z and to the inverse of the square of the distance from the radar to the rain-bearing formation. The coefficient of proportionality C is a constant characteristic of the radar and of the dielectric properties of water. This constant is not known a priori sufficiently accurately for measuring rainfall.

The radar therefore provides received signals graded as a function of its repeat frequency and its angular scan, as well as its elevation.

A conversion from polar coordinates (referred to the radar station) to Cartesian coordinates is preferably undertaken on the basis of these received signals.

In order to implement the invention, it is currently deemed necessary for the reflectivity Z to be expressed in the form of the logarithm of the ratio of the back-scattered power to the emitted power. It must be sampled over a plurality (at least 6, or better 8, preferably 12) of reflectivity levels, included between about 25 dBZ and about 56 dBZ. (The notation dBZ designates the expression in decibels of the aforesaid ratio of the reflected power to the emitted power).

Thus, on the basis of the radar data obtained for various elevations, it is known how to compile a radar image referred to geographical coordinates and representing the radar reflectivity Z of the various pixels or points, with the aforesaid resolution of 1 km × 1 km. This chart relates to a ring surrounding the radar station (or the joining up into a single ring of plural rings, relating to various elevations of observation of the radar beam). That which relates to the area ZT of FIG. 1 can be derived from this ring. The choice of the radar scan elevation is made as a function of the radial distance from the area of terrain to the radar, and in the interests of minimizing the spectrum of undesired ground echoes.

Those skilled in the art will know that it is not easy to install rain gauges at will. According to the invention, a sub-array of rain gauges which are sufficiently close together to define a mesh of between 2 and 4 kilometers are arranged at at least certain points of the area of terrain to be processed. Two such sub-arrays PA and PB can be seen in FIG. 1. The rain gauges are generally installed a priori. It may be necessary to add a few thereto in order to implement the invention.

Figure 2:
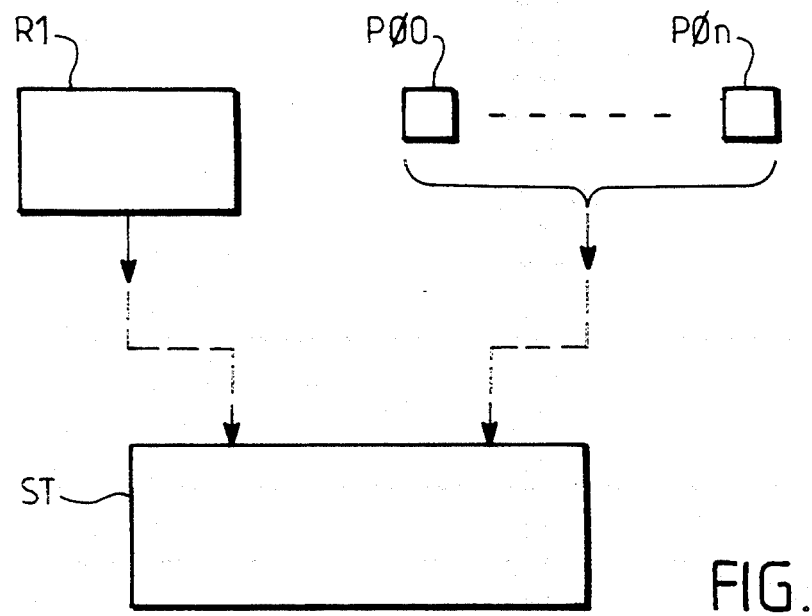
FIG. 2 illustrates diagrammatically the links from the radar and rain gauges to a processing station.

Concretely, in a preferred embodiment (FIG. 2), the radar data (R1), restricted to the work area ZT, and those from the rain gauges (P00-P0n) are transmitted to a processing station ST appertaining to an entity managing the rain gauges. The problems appertaining to this transmission will be seen further on.

Figure 3:
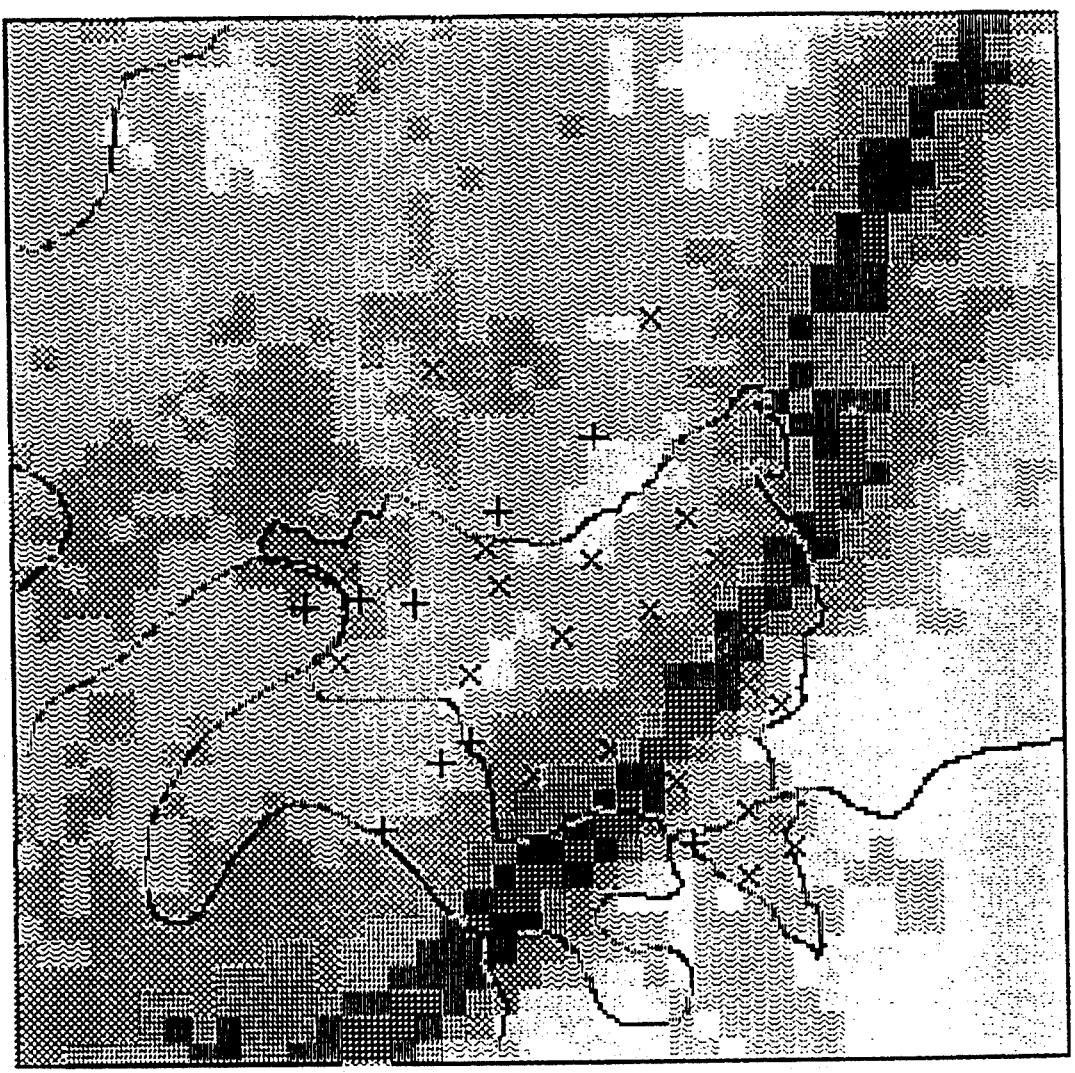
FIG. 3 is an example of an image with 16 levels representing intensities of rain and obtained with the aid of the radar for the area of terrain of FIG. 1.

FIG. 3 illustrates, for the terrain area ZT, a radar image originally in 16 levels N0–N15, which are equivalent to intensities of rain estimated on the following scale:

| Code | dBZ | Equivalent rain (mm/hour) |
| --- | --- | --- |
| N0 | <16 | <0.4 |
| N1 | 16–25 | 0.4–1.3 |
| N2 | 25–30 | 1.3–2.7 |
| N3 | 30–34 | 2.7–4.9 |
| N4 | 34–38 | 4.9–8.7 |
| N5 | 38–41 | 8.7–13.3 |
| N6 | 41–43 | 13.3–17.8 |
| N7 | 43–45 | 17.8–23.7 |
| N8 | 45–47 | 23.7–31.6 |
| N9 | 47–48 | 31.6–36.5 |
| N10 | 48–50 | 36.5–48.6 |
| N11 | 50–52 | 48.6–64.8 |
| N12 | 52–53 | 64.8–74.9 |
| N13 | 53–55 | 74.9–100 |
| N14 | 55–58 | 100–154 |
| N15 | >58 | >154 |

In the foregoing, the "equivalent rain" results from a theoretical estimation based on "average characteristics of the rain", such as observed by radar. In order to simplify the drawing, the scale of FIG. 3 (indicated as rounded values, and in common with FIGS. 4, 5 and 10) groups into one the levels N3 and N4, N5 and N6, N7 and N8, as well as N9 and N10. (The same is true for the levels N11 to N13 as well as N14 and N15, but these latter are not used in the image provided, nor is the level N0).

Despite the groupings of levels carried out, the drawing shows clearly the great complexity of the rain information as provided by the radar.

Figure 6:
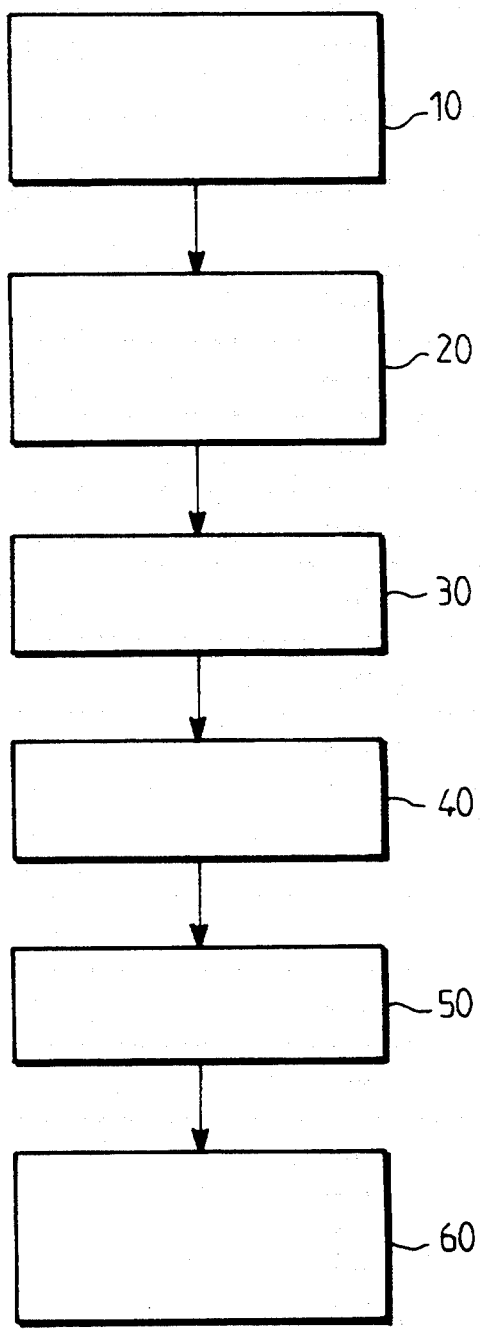
FIG. 6 is a general block diagram.

Reference is now made to FIG. 6.

Step 10 consists in acquiring the data from the rain gauges, which are transmitted to the processing station ST. Since the rain gauges are synchronized to within 1 minute and operate over a well-defined time, here 5 minutes, these data are dated accurately ("dating" refers here to the date and time, the latter being accurate to within one second).

Step 20 consists in acquiring an image from the radar, which is transmitted to the processing station ST. Its dating is trickier. Indeed, as a general rule, the date of the radar image is given by the instant of the start of transmission thereof (or the start of the radar scan, the discrepancy between the two being in principle constant). However, the radar scan commences in a direction which is virtually random with respect to the start of the entry of the beam into the area of terrain processed; this results in an uncertainty of 0/1 minute, if the scan period is 72 seconds. The way to process it will be seen further on.

Step 30 consists in processing the radar image, with "advection", that is to say taking into account the motions of the rain-bearing cells (also called "echoes").

The first operation is an image correction. Indeed, the Applicant has observed that transmission of the radar images (at least when it is done in real time) may be subject to errors which should be corrected with care. This problem is all the more pointed since the meteorological data are particularly significant during storms and since storms are by nature liable to increase the error rate for transmission by communication line or, worse still, by radio. Thus, the invention provides for a filtering of the transmission errors, carried out on the basis of analyses of possible breaks in continuity between consecutive images. The image causing such a break is rejected. A test is also carried out in respect of the inter-line continuity of any one image, likewise with rejection of a line exhibiting significant discontinuity. Furthermore, an image in which more than 30 lines have been rejected will be rejected overall (the image contains 256 lines in all). An image suitable for processing is therefore obtained in this way at processing station level.

In order to implement the invention it is advantageous, but not imperative, to carry out beforehand what will be called "ground echo processing".

Those skilled in the art will know that radars are subject to a ground echo, of fairly significant amplitude, and which is due to the back-scattering of the radar signals by the ground. Keeping in mind the small radar beam elevations used in meteorological radars, these ground echoes may be found in the image, with a fairly significant level, although they in no way correspond to rain.

Figure 7:
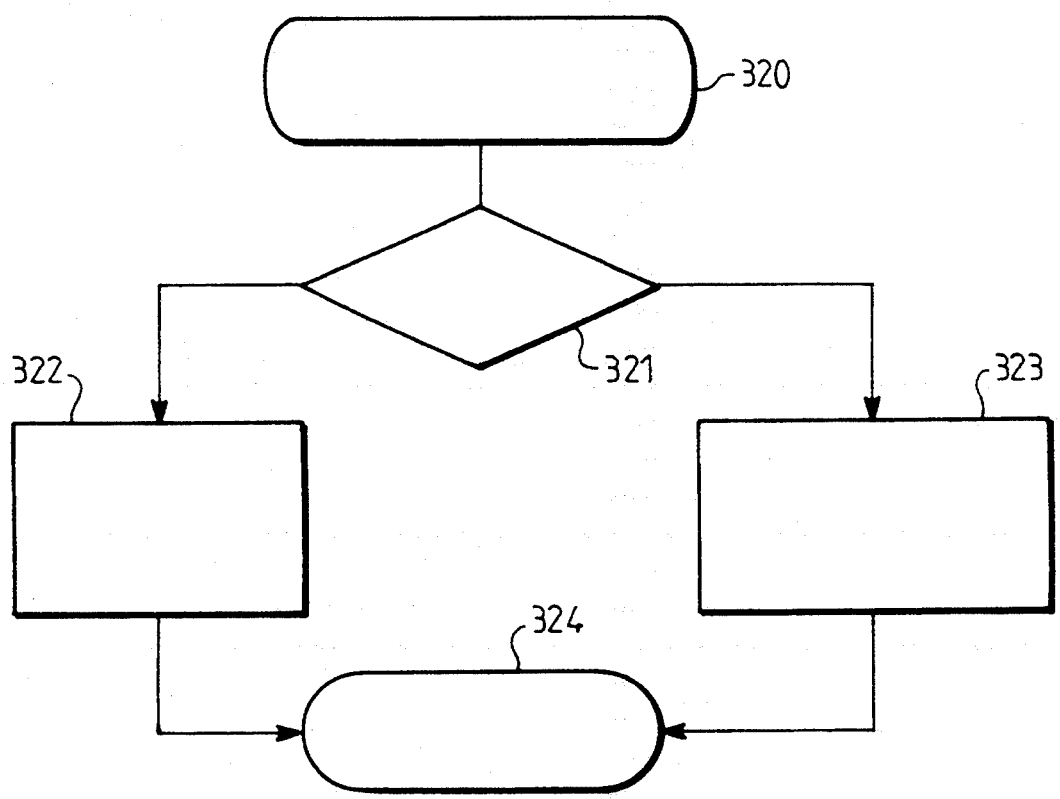
FIG. 7 is a block diagram of ground echo processing.

The mechanism for processing ground echoes is illustrated in FIG. 7 and will now be described.

After the input step 320, a test 321 determines whether the image corresponds overall to dry or rainy weather.

This can be done in various ways, based on the following criteria:
a search over the whole of the image for the number of pixels corresponding to rainy weather. The criterion may for example be the overstepping of a threshold. If the proportion of "rainy" pixels in the whole image is below a threshold of 3% (for example), the image is regarded as a dry weather image, all of whose pixels of high level will correspond to ground echoes.

A means making it possible to determine the displacements of the rain-bearing formations from one image to the next will be described below. It may also be very attractive to regard as a dry weather image any image overstepping the aforesaid threshold of 3%, but which has, by comparison with the previous image, small "Brownian" displacements (which are not cross-correlated) of substantially zero mean value. This rests upon the observation that rain-bearing cells with small displacements represent either fine weather (small "Brownian" displacements), or on the contrary shallow depression storms (small structured displacements), liable to create significant precipitations.

Of course, combinations of the two preceding criteria, possibly with other criteria, may be used to discriminate a dry weather image from a rainy weather image.

In the case of dry weather, step 322 consists in updating a ground echo chart which includes at least the area examined. This chart may be initialized beginning from weather which is recognized as dry. Subsequently it is sufficient to carry out updates thereto. Of course, the ground echoes have fixed general characteristics and hardly vary from one image to the next. They do however vary, in intensity, on a longer time scale, for various reasons.

When, on the contrary, the image corresponds to rainy weather, the pixels belonging to the ground echo chart, such as it is at the same time, will be deleted (323) from the image. These pixels will be replaced by the "extrapolated rain", in order to provide the reprocessed image (324). The fact that the displacements of the rain-bearing formations will have been determined comes in here again. This "extrapolated rain" consists in replacing the ground echo pixels by what would be expected at the same point keeping in mind the displacement determined for the rain-bearing formations obtained in the preceding image or in plural preceding images. This characteristic is particularly significant in an urban area where there are numerous point obstacles, often of fairly great height, capable of seriously disturbing the validity of the measurements.

The remainder of the processing consists in searching in the image for the main rain-bearing cells. Various types of global processing of the image may be used to this end. A simple means consists in picking a threshold connected for example with the average level of the image (or with any other statistical processing of the latter).

Figure 4:
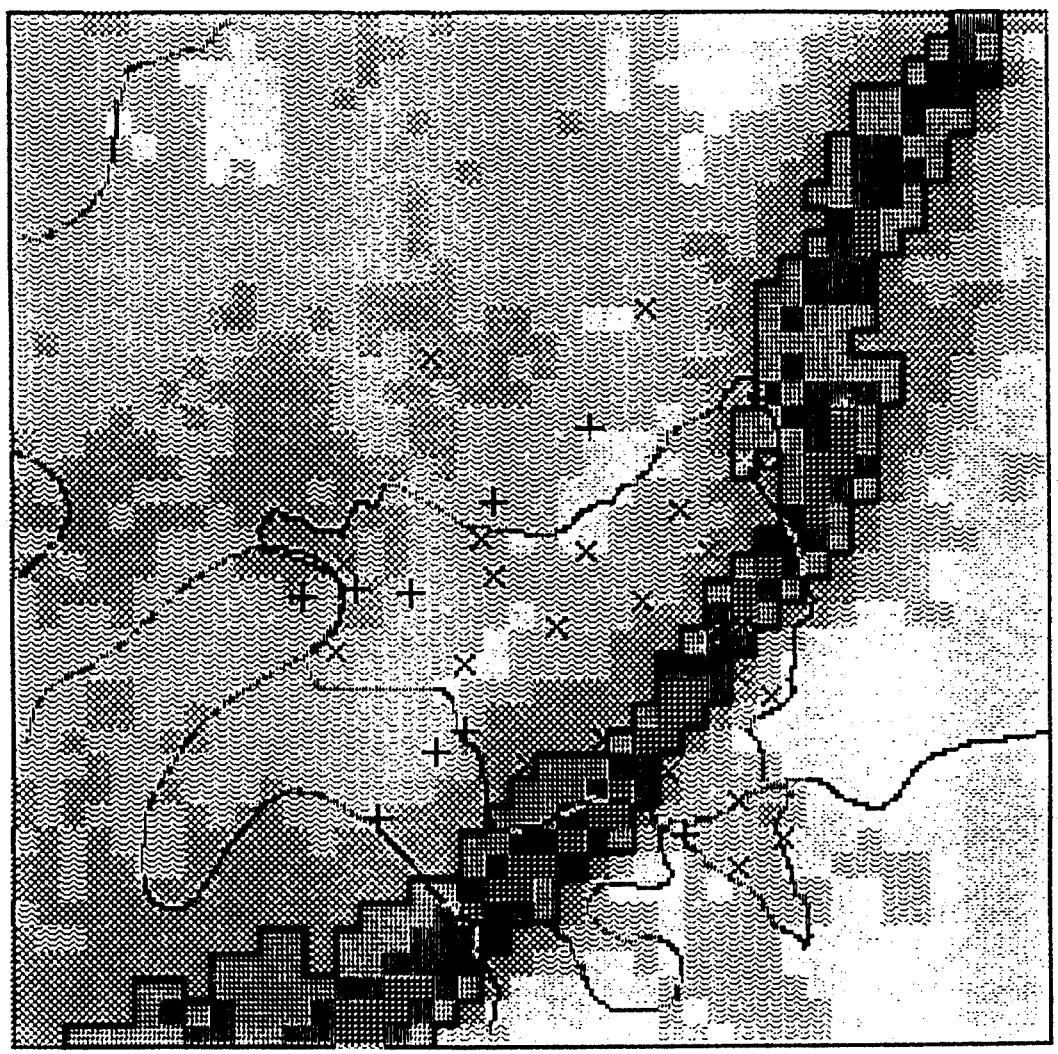
FIG. 4 illustrates the image of FIG. 3, reprocessed by applying a level threshold.

FIG. 4 results from the application of a threshold to the image of FIG. 3. Here, only the pixels with a level at least equal to 5 are retained. They are placed in the region between the two thick lines of FIG. 4. The main rain-bearing cell or cells lie in this region.

Figure 5:
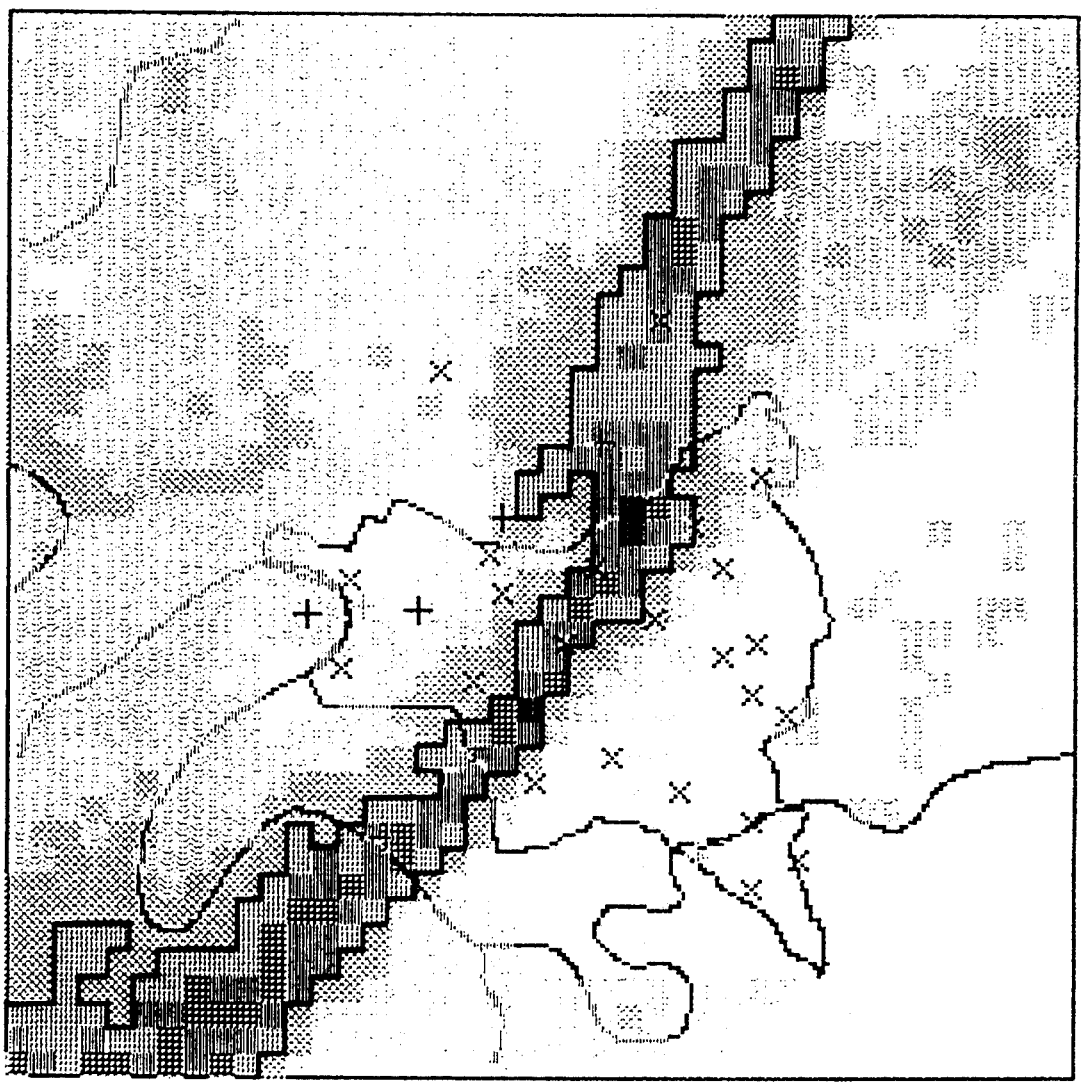
FIG. 5 illustrates an image similar to that of FIG. 4, but valid five minutes earlier.

FIG. 5 results from the same processing, but for an image five minutes older than that of FIG. 3.

Thus, the starting elements for taking into account the motion of the rain-bearing cells, from one radar image to the next, are found joined up.

Figure 8:
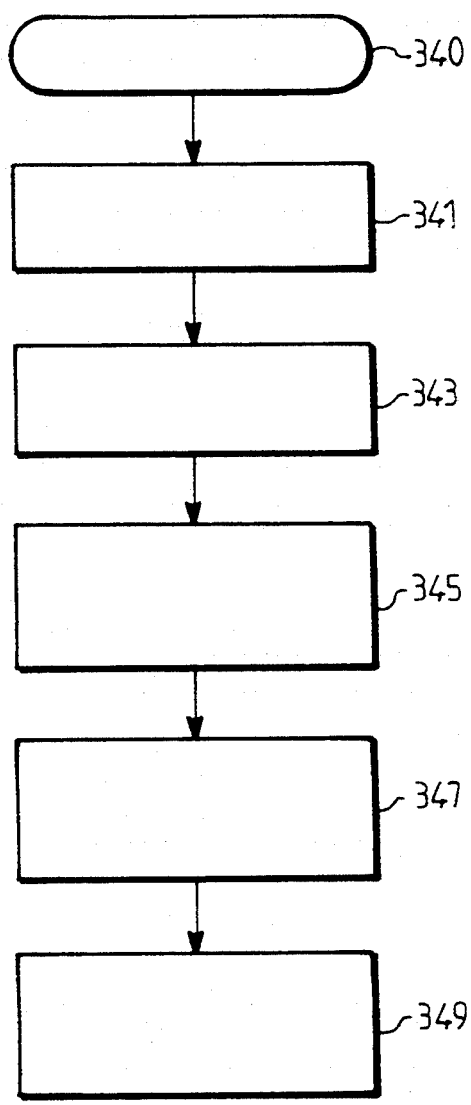
FIG. 8 is a block diagram of advection processing.

Reference is now made to FIG. 8 which illustrates this processing, often called "advection" by those skilled in the art. (The word "advection" is adopted here; it must however be understood that it may cover processing operations which differ greatly depending on the authors).

After the start step 340, the first step 341 of the processing consists in determining an analysis threshold over all the points of an image, as already described. The image contains 256×256 pixels initially. The threshold is fixed so that only a few thousand pixels of the image are retained, for example between 1500 and 5000 pixels of the image.

Step 343 then consists in searching in the thus "threshheld" image for the blocks of contiguous pixels which will be called rain-bearing cells. In this search for blocks, the isolated pixels, or those which may be tagged as corresponding to artifacts, are eliminated. To this end, it is possible to use an analysis of the shape of the blocks, especially in order to eliminate therefrom the isolated or outlier points. There is also provision for a block to have to contain a minimum number of pixels, for example 16.

More generally, the identification and shape recognition of blocks may be carried out in the way described in the doctoral thesis "INTRODUCTION D'OUTILS DE L'INTELLIGENCE ARTIFICIELLE DANS LA PRÉVISION DE PLUIE PAR RADAR", (THE INTRODUCTION OF TOOLS FROM ARTIFICIAL INTELLIGENCE INTO THE RADAR FORECASTING OF RAIN), submitted by Andreas NEUMANN on 13 Dec. 1991 at the Ecole Nationale des Ponts et Chaussées, PARIS. The descriptive contents of this thesis are incorporated in the present description, for all useful purposes. Neumann modifies an algorithm for classifying objects by a decision tree as follows:

If n is a node of a tree and ADD, the test of which is "$a^n < s$", the classification of an object o=(es, e), whose value $a''(o)$ is unknown, is effected as follows:

the classification is achieved for the two possibilities $a''(o) < s$ and $a''(o) \leq s$, the result is determined as the average of the two classifications, weighted in accordance with a frequency of the values of $a''$ in the set of test examples $X_T$.

Optional utilization of flexible thresholds has been introduced in the algorithm, the operation of which is summed up in algorithm III.6. The result of the classification of a couple (es, e) is the estimated probability that (es, e) be a good matching.

Algorithm III.6

Given: A classification context CT=(O,A,P,S) of two classes (+,−), with S={p∈[O,1]} being the probability for an object o to belong to class +. A probilistic decision tree ADD, for a knowledge-based system for CT. An object o∈O and the vector of attribute values $\vec{a}(o)$, where certain of the attribute values may be unknown.

Sought: The probability p(o) for object o, to belong to class +.

Algorithm:
(0) Node n:=root $n_o$ of ADD.
(1) if n is the terminal node, then $p_n(o):=p^n$. Else
(2) (a) If the test on n has the form "$a^n < s$": Let $s^-$ and $s^+$ be the flexible thresholds of the test, let ng and nd be the children of n, Determine $p_{ng}(o)$:n:=ng and continue with (1). Determine $p_{nd}(o)$:n:=ng and continue with (1).
   (i) If $a^n(o)$ is known:
       Classification with hard thresholds:
       If $a^n(o) < s, p_n(o):=p_{ng}(o)$.
       If $a^n(o) \leq s, p_n(o):=p_{nd}(o)$.

Classification with flexible thresholds:
if $a^n(o) < s^-$, $p_n(o) := p_{ng}$
if $s^{31} \leq a^n(o) < s$, $p_n(o) := p_{ng} + (p_{nd} - p_{ng}) \cdot (a^n(o) - s^-)/(2(s-s^-))$
if $s \leq a^n(o) \leq s^+$, $p_n(o) := p_{nd} + (p_{nd} - p_{ng}) \cdot (s^+ - a^n(o))/2(s^+ - s^-))$
if $s^+ < a^n(o)$, $p_n(o) := p_{nd}$
  (ii) If $a^n(o)$ is unknown:

$p_n(o) := p_{ng}(o) \cdot |X_T^{ng}|/|X_T^n| + p_{nd}(o) \cdot |X_T^{nd}|/|X_T^n|$ (b) If the test has the form "$a^n$ known":
let ng and nd be the children of n.
  (i) if $a^n(o)$ is known: n:=ng and continue with (1)
  (ii) if $a^n(o)$ is unknown: n:=nd and continue with (1)
(3) $p(o) := p_{no}(o)$ The matching echoes is the second step of the algorithm for the structurated methods of prevision. We apply an algorithm for matching as follows: at a given instant $t^{k+1}$, all the possible matchings between the sequences $es = (e^{es}_1 \epsilon E(l_1), \ldots, e_k^{es} \epsilon E(l_k))$ of echoes on images $l_1, \ldots, l_k$, and echoes $e \epsilon E(l_{k+1})$ on image $l_{k+1}$ are examined. The couples, whose probability to represent a good matching is higher than 0.5 are retailed. The matching of the couples thus selected is effected as follows:

(1) in decreasing order of the probability coefficient,
(2) in increasing order of the number of simple echoes belonging to both echoes $e_k^{es}$ and e, for couples having equal coefficients,
(3) random selection for couples having equal coefficients, and the same number on equal numbers of simple echoes.

The couples, having one echo already matched, are eliminated from the list. The imaginary echoes are used only if none of their part has been matched. This operation is summed up in algorithm III.7.

Algorithm III.7

Given: A sequence of images $(l_1, \ldots, l_k)(k > 0)$, in which the echoes are defined and matched together, and the radar image $l_{k+1}$. A decision tree ADD for the context of the matching.
Sought: The set $AP(l_k, l_{k+1})$ of correct matchings.
Algorithm:
  (O) $AP(l_k, l_{k+1}) := \emptyset$
  (1) Define the echoes $E_s(l_{k+1})$ and the imaginary echoes $E_i(l_{k+1})$ $E(l_{k+1}) := E_s(l_{k+1}) \cup E_i(l_{k+1})$
  (3) For all couples $(es = (e_1^{es} \epsilon E(l_1), \ldots, e_k^{es} \epsilon E(b\, l_k))$, $e \epsilon E(l_{k+1}))$, determine $p = p(class(es,e) = +)$ by classification with ADD in accordance with algorithm III.6. Create a list L of the pairs in which $p > 0.5$.
  (4) Order the list L by:
decreasing order of the probability coefficient,
increasing order of the number of simple echoes for couples having equal probability coefficients,
random for couples having the same probability coefficients and the same number of simple echoes.
$L = [(es_1, e_1), \ldots, (es_n, e_n)]$.
  (5) For $l = 1, \ldots, n$, repeat
If $es_l$ is not matched, and $e_k^{esl}$ is not an imaginary echo, or no element of $e_k^{esl}$ is being matched, and
if $e_l$ is not matched, and if $e_l$ is not an imaginary echo or no element of $e_l$ is being matched:
then match $es_l$ and $e_l$.

Thanks to the processing of unknown value, classification is possible for each object (es, e). The knowledge base system $K_{AP} = (CT_{AP}, P_{AP}, BC_{AP}, IC_{AP})$, in which $BC_{AP}$ is defined by the decision tree ADD, and $IC_{AP}$ is an implementation of algorithm III.7, is thus complete in the context $CT_{AP}$.

Consideration is given in this thesis to an echo (a rain-bearing cell) of the current image, a pair of echoes (from one image to the next), and a sequence of echoes (the same rain-bearing cell, over a succession of consecutive preceding images), and of course the current image itself.

All or some of the following parameters are used in respect of an echo:
  the size or surface area of the echo (km$^2$),
  the mass or rain flow of the echo (m$^3$/hour)
  the mean and maximum intensities of the echo (mm/h)
  the variance of the intensity of the echo,
  the coordinates of the centroid of the echo,
  the minimum and maximum inertias of the echo, as well as its maximum angle of inertia,
  the dispersion of the echo (the difference between maximum and minimum inertia, referred to the square of its size),
  the elongation of the echo (the difference between maximum and minimum inertia, referred to their sum).

Similarly, all following parameters are used in respect of a pair of echoes:
  speed of displacement corresponding to the distance of the two centroids,
  direction of displacement corresponding to the two centroids.

Similarly, all or some of the following parameters are used in respect of a sequence of echoes:
  mean speed and mean direction of displacement of the echo over the collection of images of the sequence,
  mean relative variation of the size and mass of the echo between the start of the sequence and the last image of the latter (for example, relative variations are calculated between the last image of the sequence and the images of the start of the sequence, excluding the last three, and these relative variations are averaged),
  mean change of elongation between the start of the sequence and the last image of the latter, (for example, changes of elongation are calculated between the last image of the sequence and the images of the start of the sequence, excluding the last three, and these values of change of elongation are averaged).

The following parameters are used in respect of an image:
  mean of the mean velocities of all the defined sequences of echoes,
  mean of the mean directions of all the defined sequences of echoes.

More detailed elements for use in these calculations may be found in appendix A1 ("Definition of the attributes of the context") of the said thesis. Calculation of the parameters is covered by step 345.

In the following, we set forth the parameters being used in this study, for describing the echoes and the sequences, as well as the attributes of the context of matching, as they have been used in the description of objects $(es, e) \epsilon O_{AP}$. Let $l_1, \ldots, l_n$ be the sequence of radar images, measured at times $T_1, \ldots, t_n$; let $es = (e_1 \epsilon E(l_1), \ldots, e_n \epsilon E(l_{n-1}))$ be a strict sequence of echoes, and $e_n \epsilon l_n$ be an echo of image $l_n$.

For an echo e, we define:
A(e) the size (surface) of the echo (km$^2$)

M(e) the mass (flux) of the echo ($10^3$ m$^3$/h)

$R_{moy}(e)$ the average intensity of the echo (mm/h)

$R_{var}(e)$ the maximum intensity of the echo $C_s(e), c_s(e)$ the coordinates of the barycentre of the echo $1_{max}(e), 1_{min}(e)$ the maximal and minimal inertia of the echo T(e) the angle of the maximal inertia axis of the echo ($\in [0,\pi)$)

D(e) the dispersion of the echo:

$$D(e) \frac{I_{max}(e) - I_{min}(e)}{A(e)^2}$$

E(e) the elongation of the echo:

$$E(e) = \frac{I_{max}(e) - I_{min}(e)}{I_{max}(e) + I_{min}(e)} \quad (\in [0,1])$$

For a couple of echoes ($e_1, e_2$), we define:

$V(e_1, e_2)$ the velocity of displacement corresponding to the distance of the two barycentres (km/h)

$D(e_1, e_2)$ the direction of displacement corresponding to the two barycentres (rad)

For a sequence of echoes es, we define:

$V_{moy}(es)$ the average velocity of displacement within time interval ($t_1, t_{n-1}$) (km/h)

$D_{moy}(es)$ the average direction of displacement within time interval ($t_1, t_{n-1}$) (rad)

$DA_{moy}(es)$ the average of the relative size difference within time interval ($t_{max(1,n-4)}, t_{n-1}$)

$DM_{moy}(es)$ the average of the relative mass different within time interval ($t_{max(1,n-4)}, t_{n-1}$)

$DE_{moy}(es)$ the change of the elongation within time interval ($t_{max(1,n-4)}, t_{n-1}$)

For an image I, we define:

$ImV_{moy}(I)$ the average of the velocities $V_{moy}(es)$ of sequences $es = (e_1^{es}, \ldots, e_k^{es})$ with $e_k^{es} \in E(I)$ $ImD_{moy}(I)$ the average of directions $D_{moy}(es)$ of sequences $es = (e_1^{es}, \ldots, e_k^{es})$ with $e_k^{es} \in (I)$ For the description of the couples (es, e) (objects of the context $CT_{AP}$), the following attributes have been defined:

(1) the velocity of displacement corresponding to the distance of the barycentres of echoes $e_{n-1}$ and $e_n$ $$Co\_Dep\_Vit(es, e) = \frac{60}{t_n - t_{n-1}} \| (C_x(e_{n-1}), C_y(e_{n-1})) - (C_x(e_n), C_y(e_n)) \|$$

(2) the relative size difference of echoes $e_{n-1}$ and $e_n$ $$Co\_D\_Taill(es, e) = \frac{1}{t_n - t_{n-1}} \frac{A(e_n) - A(e_{n-1})}{A(e_{n-1})}$$

(3) the relative mass difference of echoes $e_{n-1}$ and $e_n$:

$$Co\_D\_Masse(es, e) = \frac{1}{t_n - t_{n-1}} \frac{M(\epsilon_n) - M(\epsilon_{n-1})}{M(e_{n-1})}$$

(4) the relative difference in average intensity of echoes $e_{n-1}$ and $e_n$ $$Co\_D\_IntMo(es, e) = \frac{1}{t_n - t_{n-1}} \frac{R_{moy}(e_n) - R_{moy}(e_{n-1})}{R_{moy}(e_n - 1)}$$

(5) the relative difference of maximum intensity of echoes $e_{n-1}$ and $e_n$ $$Co\_D\_IntMa(es, e) = \frac{1}{t_n - t_{n-1}} \frac{R_{max}(e_n) - R_{max}(e_{n-1})}{R_{max}(e_{n-1})}$$

(6) the relative difference of variance of the intensity of echoes $e_{n-1}$ and $e_n$ $$Co\_D\_IntVa(es, e) = \frac{1}{t_n - t_{n-1}} \frac{R_{var}(e_n) - R_{var}(e_{n-1})}{R_{var}(e_{n-1})}$$

(7) the difference of the angles of the principal axis of echoes $e_{n-1}$ and $e_n$ $$Co\_D\_Angle(es, e) = \frac{1}{t_n - t_{n-1}} |\tau(e_n) - \tau(e_{n-1})|$$

(8) the difference in dispersion of echoes $e_{n-1}$ and $e_n$ $$Co\_D\_Dispe(es, e) = \frac{1}{t_n - t_{n-1}} |D(e_n) - D(e_{n-1})|$$

(9) the difference in elongation of echoes $e_{n-1}$ and $e_n$ $$Co\_D\_Elong(es, e) = \frac{1}{t_n - t_{n-1}} |E(e_n) - E(e_{n-1})|$$

(10) the distance of echoes $e_{n-1}$ and $e_n$ relative to the average velocity of displacement of image $1_{-n-1}$ $$Co\_DepVitV(es, e) = \begin{cases} \frac{1}{t_n - t_{n-1}} \frac{Co\_Dep\_Vit(es, e) - ImV_{moy}(I_{n-1})}{ImV_{moy}(I_{n-1})} & \text{if } ImV_{moy}(I_{n-1}) \text{ known} \\ \text{unknown} & \text{else} \end{cases}$$

(11) the direction of displacement corresponding to the barycentres of echoes $e_{n-1}$ and $e_n$ relative to the average direction of displacement of image $1_{-n-1}$ $$Co\_DepDirV(es, e) = \begin{cases} \frac{1}{t_n - t_{n-1}} |D(e_{n-1}, e_n) - ImD_{moy}(I_{n-1})| & \text{if } ImD_{moy}(I_{n-1}) \text{ known} \\ \text{unknown} & \text{else} \end{cases}$$

(12) the distance of echoes $e_{n-1}$ and $e_n$ relative to the average direction of displacement of sequence es $$Co\_DepVitR(es, e) =$$

-continued $$\left\{\begin{array}{ll} \frac{1}{t_n - t_{n-1}} \frac{Co\_Dep\_Vit(es, e) - V_{moy}(es)}{V_{moy}(es)} & \text{if } n > 2 \\ \text{unknown} & \text{else} \end{array}\right.$$

(13) the direction of displacement corresponding to the barycentres of echoes $e_{n-1}$ and $e_n$ relative to the average direction of displacement of sequence es $$Co\_DepDirR(es, e) = \left\{\begin{array}{ll} \frac{1}{t_n - t_{n-1}} |D(e_{n-1}, e_n) - D_{moy}(es)| & \text{if } n > 2 \ (\in[0, \pi)) \\ \text{unknown} & \text{else} \end{array}\right.$$

(14) the relative difference in size of echoes $e_{n-1}$ and $e_n$ relative to the average rate of size development of sequence es $$Co\_DTaillR(es, e) = \{Co\_D\_Taill(es, e) - DA_{moy}(es) \text{ if } n > 2$$
$$\text{unknown} \quad \text{else}$$

(15) the relative mass difference of echoes $e_{n-1}$ and $e_n$ relative to the average rate of mass development of sequence es $$Co\_DMasseR(es, e) = \{Co\_D\_Masse(es, e) - DM_{moy}(es) \text{ if } n > 2$$
$$\text{unknown} \quad \text{else}$$

(16) the relative difference of elongation of echoes $e_{n-1}$ and $e_n$ relative to the average change of elongation of sequence es $$Co\_DElongR(es, e) = \{Co\_D\_Elong(es, e) - DE_{moy}(es) \text{ if } n > 2$$
$$\text{unknown} \quad \text{else}$$

(17) the distance of echoes $e_{n-1}$ and $e_n$ relative to the average velocity of displacement of sequence es, if this last is enough reliable $$Co\_DepVitT(es, e) = \{Co\_DepVitR \text{ if } t_{n-1} - t_1 \geq 15 \text{ min}$$
$$\text{unknown} \quad \text{else}$$

(18) the direction of displacement corresponding to the barycentres of echoes $e_{n-1}$ and $e_n$ relative to the average direction of displacement of the sequence, if the last is enough reliable $$Co\_DepDirT(es, e) = \{Co\_DepDirR \text{ if } t_{n-1} - t_1 \geq 15 \text{ min}$$
$$\text{unknown} \quad \text{else}$$

(19) the relative difference of size of echoes $e_{n-1}$ and $e_n$ relative to the average rate of development of the size of the sequence es, if the last is enough reliable $$Co\_DTaillT(es, e) = \{Co\_DTaillR \text{ if } t_{n-1} - t_1 \geq 15 \text{ min}$$
$$\text{unknown} \quad \text{else}$$

(20) the relative difference of masse of echoes $e_{n-1}$ and $e_n$ relative to the average rate of mass development of sequence es, if this last is enough reliable $$Co\_DMasseT(es, e) = \{Co\_DMasseR \text{ if } t_{n-1} - t_1 \geq 15 \text{ min}$$
$$\text{unknown} \quad \text{else}$$

(21) the average difference of elongation of echoes $e_{n-1}$ and $e_n$ relative to the average change of elongation of sequence es, if this last reliable enough $$Co\_DElongT(es, e) = \{Co\_DElongR \text{ if } t_{n-1} - t_1 \geq 15 \text{ min}$$
$$\text{unknown} \quad \text{else}$$

The values of attributes No 1–9 are known for all couples (es,e), while the values of attributes No 10 and 11 are known only if there exist echoes on image $1_{n-1}$, which belong to sequences observed before $t_{n-1}$, and the values of attributes No 12–16 are unknown if the sequence es is not trivial. With a view to take instability of the values of attributes No 12–16 into account, we have introduced the attributes No 17–21, which are defined only when the sequence es has a length higher than 15 minutes.

In the decision tree $ADD_{APP}$, the attributes No 1, 2, 3, 6, 7, 8, 17 et 18 are used (cf FIG. IV.9).

The decision tree of FIG. IV-9 of the thesis then makes it possible to solve all the cases of identification of rain-bearing cells (or blocks of pixels, or echoes), with history fitting in respect of the older images (step 347). Basically, this step 347 can be regarded as a fit to the block parameter tables obtained for one or more preceding images and for the current image.

However, it must be borne in mind that the rain-bearing cells may merge into one another, or on the contrary separate from one another, appear, disappear, among other things. Establishing a relationship between the blocks of the preceding images is therefore a complex operation. In practice, this operation is carried out on the basis of a hierarchical order of the blocks of the preceding image, and of a decision tree involving the thresholds applied to the images, the shape characteristics of the blocks (which comprise their centers), and their speed characteristics, as already described in detail.

This done, step 349 consists in extrapolating the future displacements of the blocks which have just been processed for the current image. This extrapolation is important, in particular to simplify step 345. Indeed, the rain-bearing blocks or cells of the current image will not be compared directly with those of the preceding image. The rain-bearing blocks or cells of the current image will be compared with the extrapolation of the future displacements, keeping in mind the period between images, which had previously been established with the blocks of the previous image.

It is arguably possible to undertake the operations for relationships between blocks by merely comparing the previous image with the current image. By contrast, as regards the extrapolation, it is preferable to undertake the latter over a cascade of older tables, covering for example five successive states obtained from the radar for the rain-bearing blocks or cells of concern to the relevant area of terrain.

In this way, a "tracking" of the rain-bearing cells is available, referred to the dates of the radar images.

An estimated rainfall measurement chart relating to the area of terrain ZT will be constructed therefrom.

This chart representing the sum of the rain received at each point over a chosen time interval ("second time interval"). The definition of the points or pixels is still the same, namely that each covers an area of about 1 km×1 km.

This chart differs profoundly from the radar images:
a radar image is a sampling of the rain-bearing cells at a given instant (not known accurately). The period between two images is about 5 minutes.

the chart is an estimation of the intensity of the rain received on the ground, at all points, during a well-defined time interval.

Figure 9:
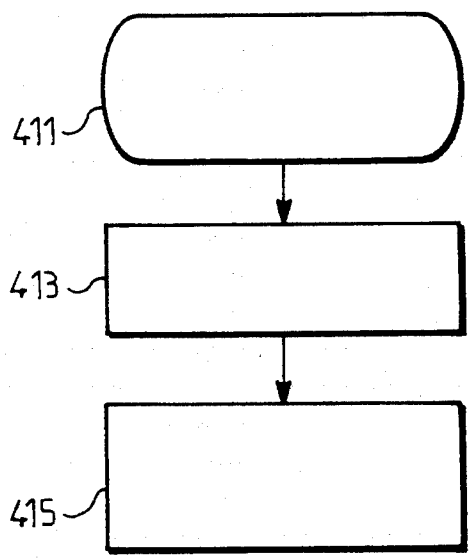
FIG. 9 is a block diagram of an accumulation processing to obtain the accumulated radar chart.

The preferred procedure for compiling the chart is illustrated in FIG. 9.

Step 411 recalls the availability of a current image, a previous image, and a descriptive history of the rain-bearing cells contained in these images, with their displacement.

Figure 10:
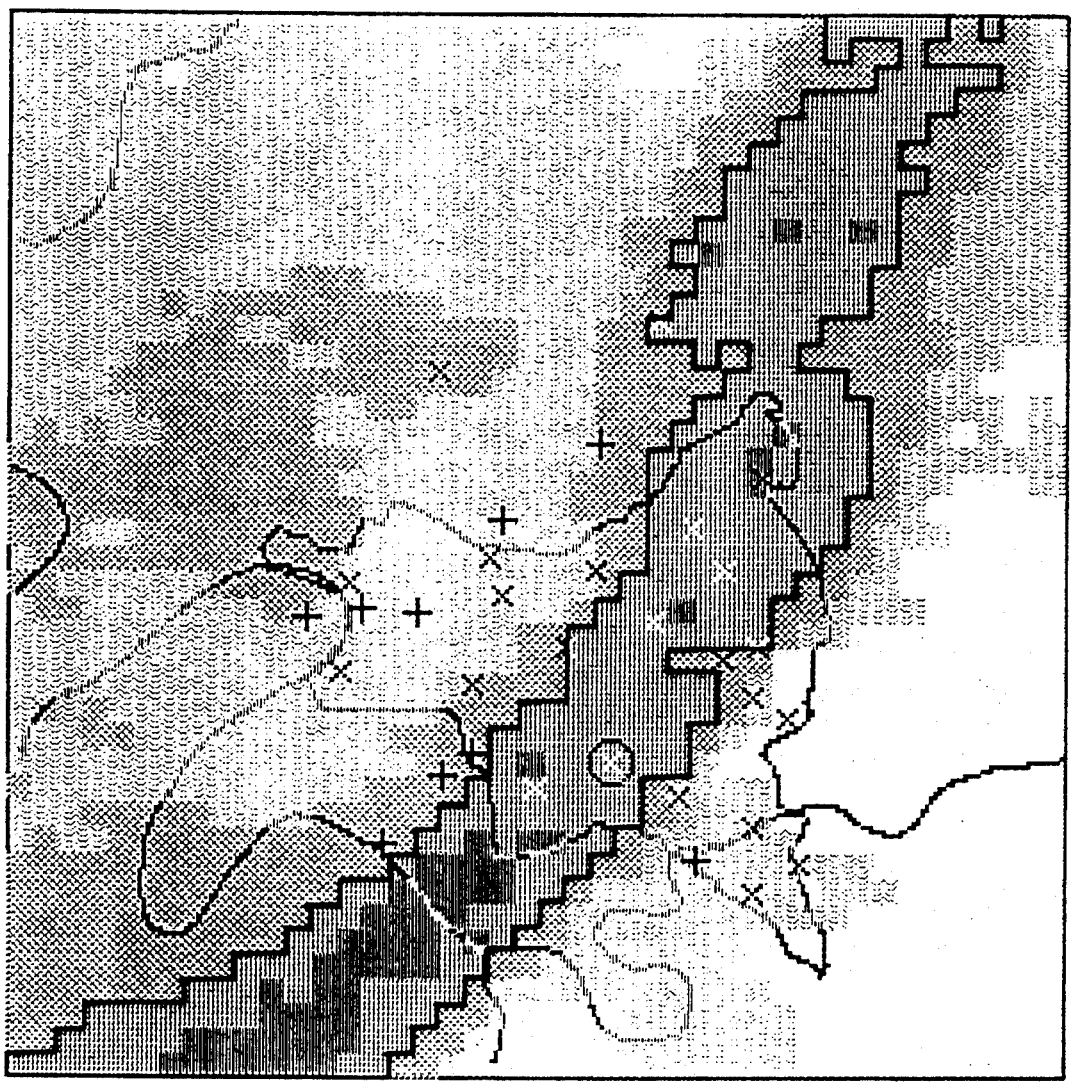
FIG. 10 is an advected image derived from the images of FIG. 4 and 5.

The motion of each rain-bearing cell during the time interval separating the previous image (FIG. 5) and the current image (FIG. 4) is deduced by interpolation. The result is illustrated in FIG. 10 which shows a broadening of the band of intense rain (between the thick lines). Arrows give the speed of displacement vectors schematically at certain points. This FIG. 10 therefore shows, for purely illustrative purposes, the mean effect of the rain-bearing cells over the time interval between the images of FIGS. 5 and 4.

Step 413 consists in summing, in each pixel, the rains due to the main rain-bearing cells, taking into account their individual displacement. Step 415 consists in summing, in each chart-pixel, the rains due to the radar pixels situated outside the main rain-bearing cells, if such exists (of significance). These points are those which were regarded as below the threshold in step 341. For all these points a displacement equal to the mean displacement of the collection of rain-bearing cells for the whole image is supposed. Of course, in step 415, the very low levels, which would cause negligible precipitations, can be eliminated.

The time for which the summation is carried out will in principle correspond to the periodicity of accumulation of the rain gauges set up on the ground, here 5 minutes. It is preferably a multiple of this duration, less than about 30 minutes (the mean lifetime of the rain-bearing cells is 20 minutes). A time interval of 15 minutes is considered.

If, in this interval of 15 minutes, another radar image has been obtained, it will be subjected to the same processing as before. Also, the arithmetic mean of this new image and the previous one is constructed.

The effect of the various steps for the implementation of the invention is illustrated in FIGS. 11 to 14.

Figure 11:
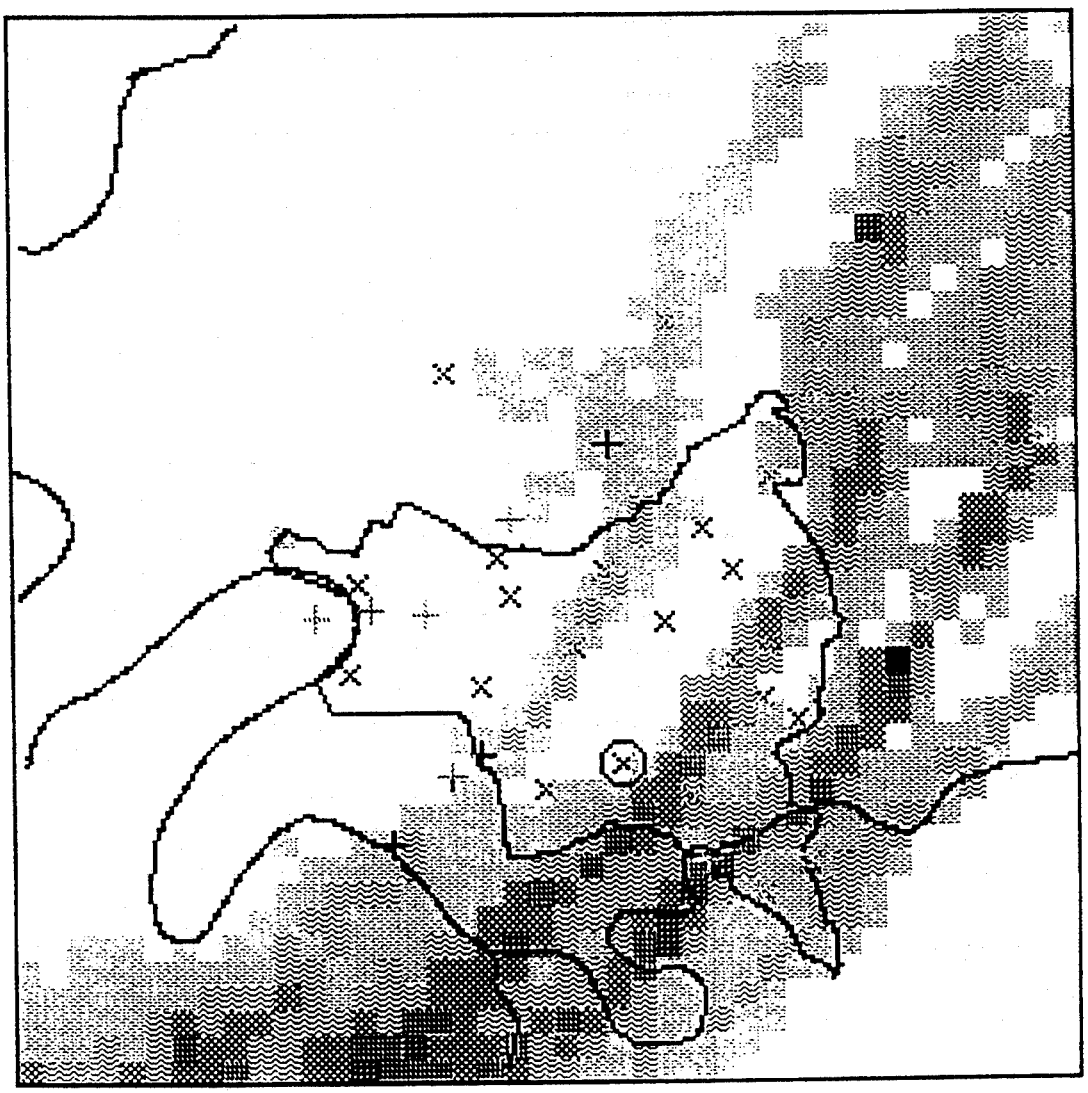
FIG. 11 is a first radar rainfall measurement chart corresponding to the raw accumulation of the images of FIGS. 4 and 5, without taking into account the motions of the rain-bearing cells, or calibration by the rain gauges.

FIG. 11 illustrates an accumulation of rain over a quarter of an hour. This chart is obtained without advection and without calibration, that is to say without taking into account the displacement of the rain-bearing cells. The artificial presence of peaks and troughs, due to the time discrepancy between the images or samples obtained by the radar for the rain-bearing formations, are seen to be quite obviously apparent there.

Figure 12:
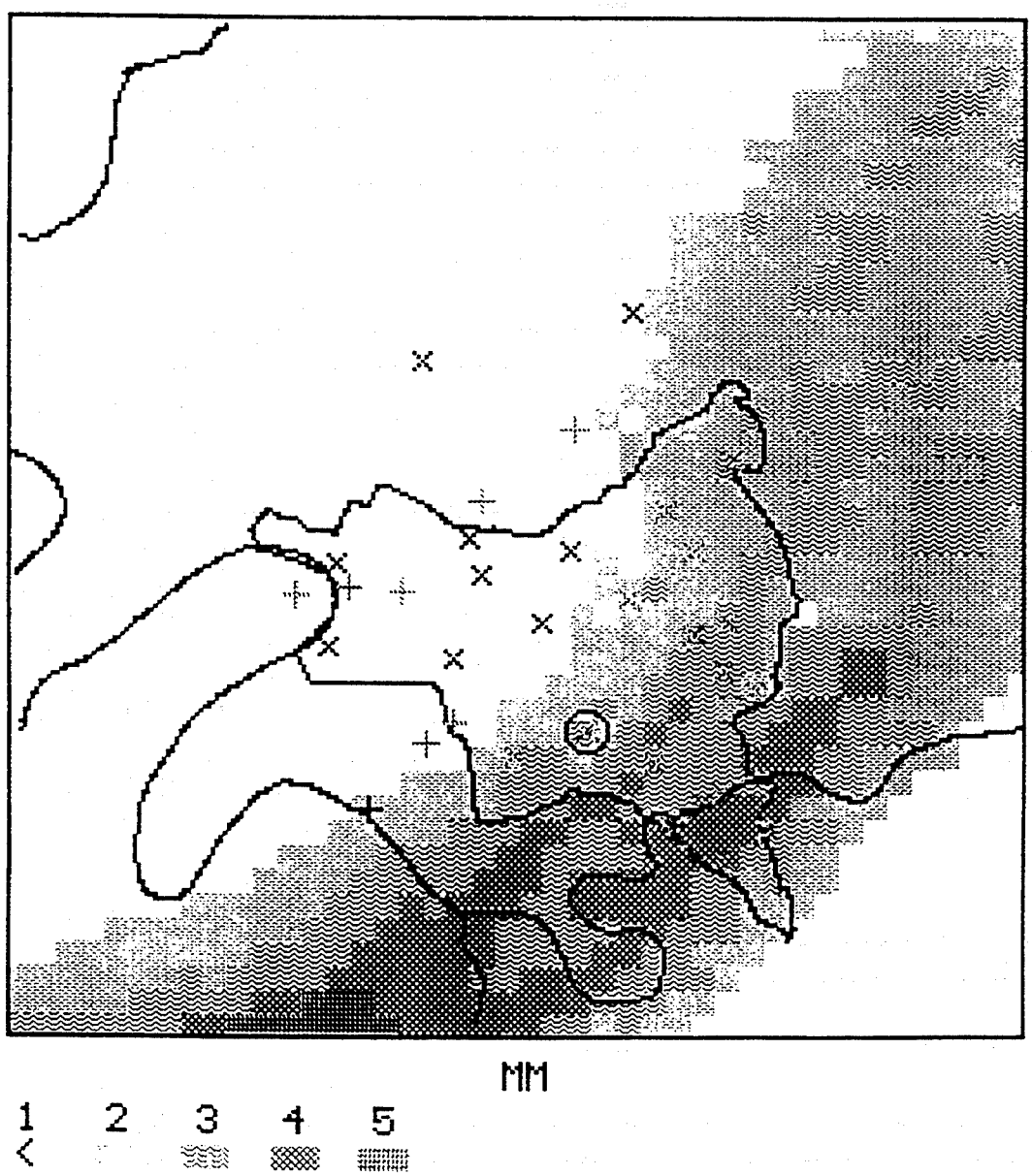
FIG. 12 is a second chart similar to that of FIG. 11, but taking into account the motions of the rain-bearing cells.

The chart of FIG. 12 takes into account the motion of the rain-bearing cells over the same period of a quarter of an hour. Examination shows immediately that this chart is much sharper, in the sense that it has hardly any more discontinuity.

Attention is now turned to the remaining operations, which relate to the calibrating of the radar rainfall measuring charts from true rainfall measurement data derived from the sensors or rain gauges.

Figures 15, 16:
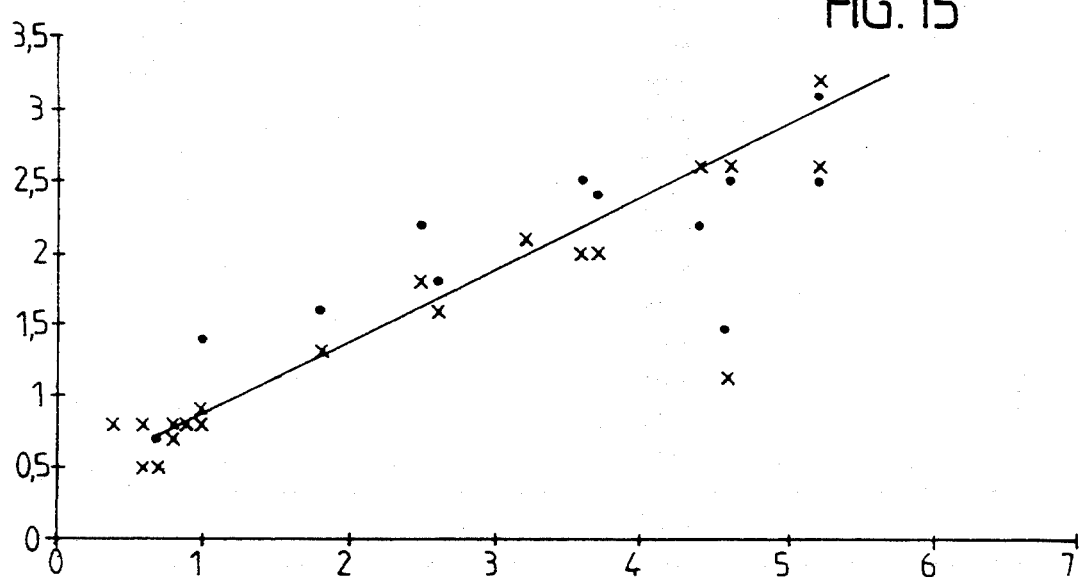
FIG. 15 is a table comparing the radar data and those from the rain gauges, for cases similar to those of FIGS. 13 and 14.
FIG. 16 is a graph illustrating an example of a statistical fit of the radar data and those from the rain gauges, for cases similar to those of FIGS. 13 and 14.

A table is therefore produced, an example of which is given in FIG. 15. Opposite an identification for the rain gauges, this table comprises:
the true accumulation from the rain gauge over 15 minutes,
the raw value of the radar chart for the pixel of the rain gauge,
a "resynchronized" value of the radar chart for the pixel of the rain gauge, and
a cause for possible rejection of this rain gauge.

As already indicated, a restriction is made to a sub-collection of rain gauges defining at least one subarray having a mesh of between 2 and 4 km. The Applicant has indeed noted that such a sub-array makes it possible to observe with certainty the passage of virtually all the significant rain-bearing cells which cross it, and whose mean characteristics are: size 4 km×4 km, speed 40 km/h, lifetime 20 minutes.

The rain gauges must therefore firstly be synchronized with one another. Furthermore, it is often desirable to effect a resynchronization of the data arising from the radar, in order to take account of:
the uncertainty in the dating (day, hour, minutes) of the radar images used,
the time taken by the raindrops to reach the ground, with a mean speed which can be fixed at from 6 to 9 meters per second,
better still, account may be taken of the estimated altitudes of the rain-bearing formations of the chart, knowing the scan elevation of the radar and the radial distance from these rain-bearing formations to the radar.

The resynchronizing of the radar chart consists in (relatively) shifting the (inaccurate) time reference of the radar images with respect to the (accurate) time reference of the rain gauges, keeping in mind the remarks above.

The present invention furthermore provides for the possible rejection of a measurement in the following various cases:
when the radar data for the pixel in which the rain gauge is located are surrounded by other pixels possessing a much higher value (more generally when the accumulated rain image arising from the radar exhibits a high gradient in the area in which the rain gauge is located),
when it is a question of outlier values, which are situated for example outside the 95% confidence interval of a linear regression.

FIG. 16 represents the data arising from the radar in millimeters of water, vertically, as a function of the data arising from the rain gauge, horizontally.

The points marked with a circle are those which are valid for the unsynchronized radar; the points marked with the multiplication sign X are valid for the resynchronized radar.

It is immediately apparent on examining FIG. 16 that the resynchronizing of the radar considerably improves the effects of the linear regression.

The aim of the calibration is:
to alleviate the shortcomings in electronic standardization of the radar: for example, a temperature variation of a few degrees introduces a distortion in the response of the logarithmic amplifier which provides the level in dBZ,
to give accurately the parameters of the relation $$Z = A \cdot R^b$$

between the measure Z of the radar reflectivity in dBZ and the estimation R of the corresponding rainfall intensity measurement. The parameters A and b have known orders of magnitude, which depend on the type of rain-bearing formations present (for example, proposed theoretical values are A=200 and b=1.6 for stratiform rainfall, as against A=486 and b=1.37 for convective rainfall). Indeed, these values are variable, even during a given rain-bearing event.

The commonest shortcoming in electronic standardization is the drifting of the zero of the radar scale in dBZ, which impinges on the entire measurement scale. This shortcoming can be tagged from one image to the next because of the modifying of the statistical distribution law for the levels in the image. More generally, if this shortcoming persists over a long period, it will thus encompass several rainfalls; in this case, a distortion is seen between the distribution of the radar measurements and that of the true rain gauge measurements (divided up into classes of levels similar to the radar measurements); and this distortion is the same over independent periods of accumulation of the rain gauges set up on the ground.

Preferably, this drift is corrected to begin with, although, at least in certain cases, it could be envisaged that this correction would not be made. Calibration therefore consists, firstly, in compensating for the drifting of the electronic zero if it is observed over a long duration or if it is observed on every other image, by adding this drift to the radar measurements.

The parameter A varies mainly as a function of the size of the drops, which is itself very variable over time during the rain created by any one rain-bearing cell (from the large drops produced at the creation of the cell, to the fine drops when it disappears). Thus, the calibration will be applied to follow the mean factor A over this rain-bearing cell, throughout its lifetime.

It is particularly important to make a comparison over an array comprising sub-arrays with a mesh of from 2 to 4 km, ensuring determination of this mean factor throughout the lifetime of a cell or over an appreciable portion of this lifetime.

The simplest comparison is a linear regression (FIGS. 15 and 16). The calibration factor will then be, for example:

either the observed value of the slope of the regression line, or the mean value through which the regression line passes or a smoothed value, relating to several time steps, of the above values.

The application of this calibration factor is carried out for the time step in which it was calculated:

either over the whole of the area of terrain if the latter is of sufficiently limited size to not be affected by very different rain-bearing cells at the same instant, or, on the other hand, over a portion of the area of terrain adjoining the sub-array used for calibration.

Figure 13:
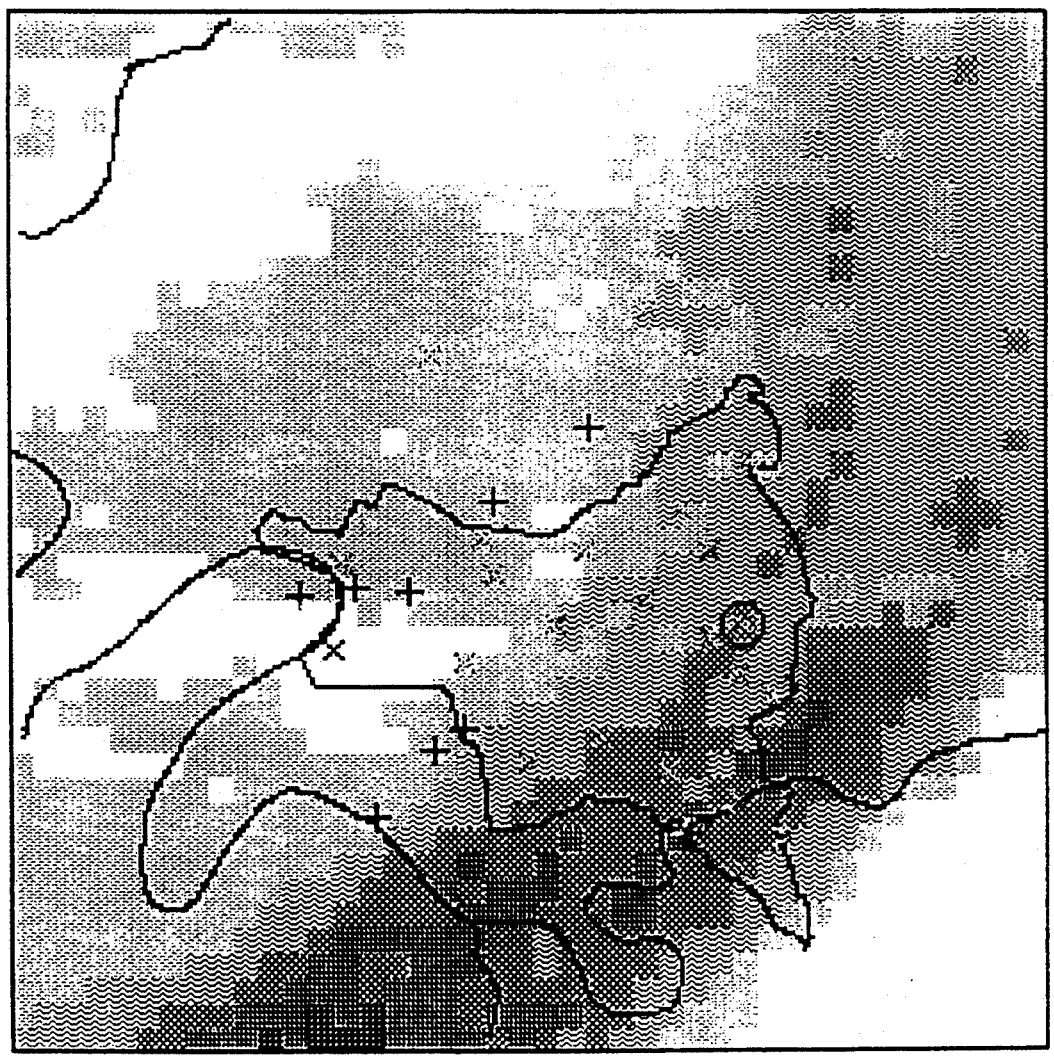
FIG. 13 is a third chart similar to that of FIG. 12, but with calibration by the rain gauges.

FIG. 13 shows a chart obtained from the same data as FIG. 12, but after calibrating the rainfall accumulation with respect to an array of rainfall recorders, in accordance with the present invention. The very sizeable differences existing between FIGS. 12 and 13 show the major contribution of the present invention to the subject.

Figure 14:
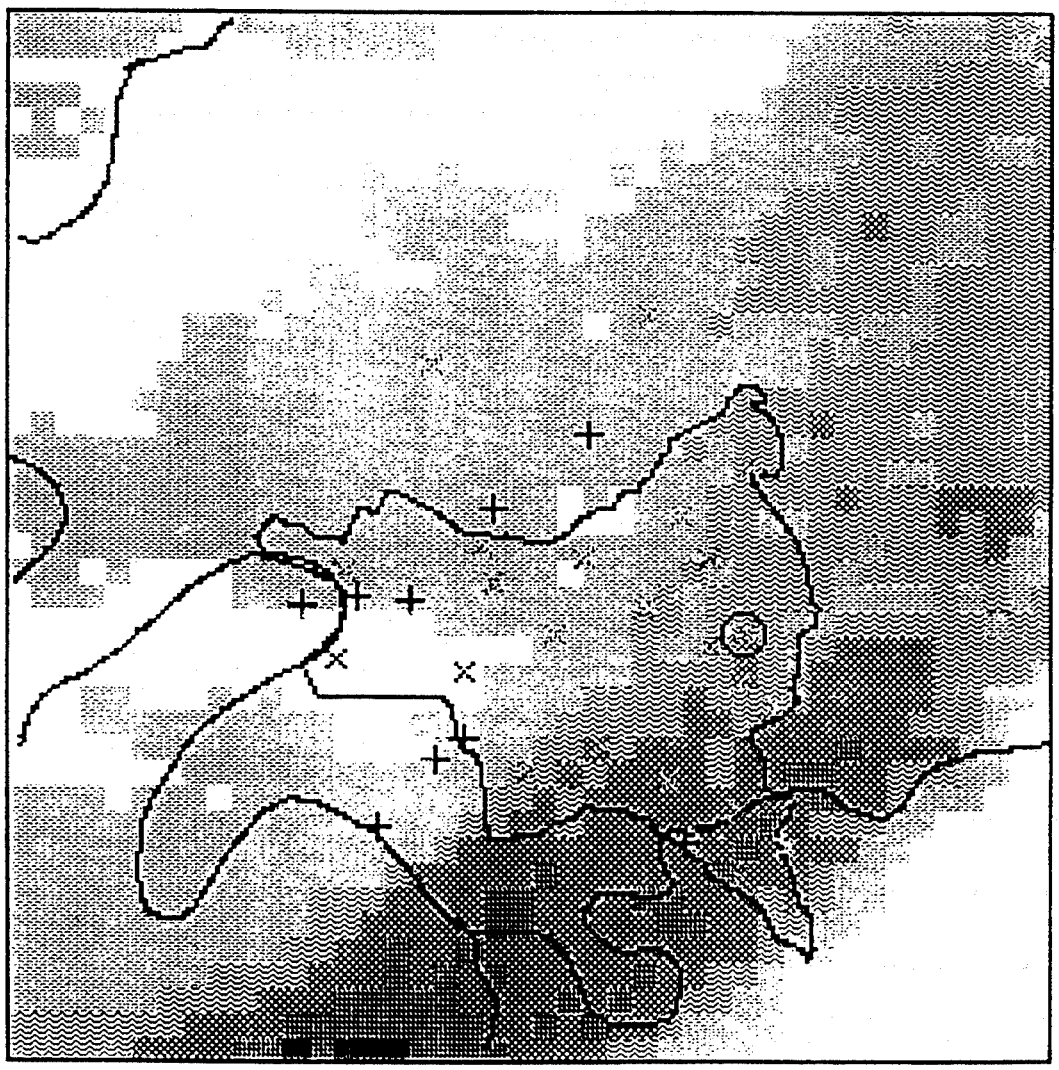
FIG. 14 is a fourth chart similar to that of FIG. 13, but after re-synchronization of the radar data.

In order to be even more accurate, the radar data are resynchronized by delaying them by one minute. The chart of FIG. 14 is then obtained which reflects even more closely the accumulated rainfall data which it is sought to obtain.

The measurements from the unused rain gauges in sub-arrays may serve, through comparison with the data from the final chart, to check the latter.

We claim:

1. A process for evaluating precipitation over an area of terrain, comprising the steps of:
    deploying automatic rain gauges within the area of terrain;
    synchronizing the rain gauges;
    providing, via the rain gauges, dated local rainfall data accumulated over a first chosen time interval
    sampling pixels of radar images over a plurality of reflectivity levels to obtain meteorological radar data with given radar periodicity, the radar images representing rain-bearing cells over a radar workspace which encompasses the area of terrain; analyzing a succession of radar images within the area of terrain to track main rain-bearing cells dynamically by their shape and motion;
    compiling a radar rainfall measurement chart by accumulating, for each pixel of the area of terrain, precipitations during a second chosen time interval which are due to the main rain-bearing cells by interpolating the shapes and positions of the main rain-bearing cells during the second time interval,
    selecting from the deployed automatic rain gauges at least one sub-array of at least four rain gauges which are separated from one another by about 2 to 4 kilometers and are affected by at least one main rain-bearing cell: and
    correcting a rainfall measurement chart as a function of a relationship between the rainfall data provided by the rain gauges of the selected at least one sub-array and rainfall data from the rainfall measurement chart taking into account a ratio between the first and second chosen time intervals 2. The process according to claim 1, wherein the first time interval is a maximum of about 6 minutes, and the second time interval is a maximum of about 30 minutes.

3. The process according to claim 1, further comprising, before the analyzing step, a step of processing ground echoes, including:
    conducting a global preanalysis of the radar image in order to determine whether the radar image relates to dry or rainy weather;
    updating a radar ground echo chart if the preanalysis determines the radar image relates to dry weather; and
    replacing points belonging to the radar ground echo chart by pixels extrapolated from previous images if the radar image relates to rainy weather.

4. The process according to claim 3, comprises:
    wherein the step of processing ground echoes further includes:
    searching a current image for main rain-bearing cells in the form of blocks of pixels satisfying a chosen condition by fitting current main rain-bearing cells with main rain-bearing cells from previous images to dynamically track the shape and motion of the main rain-bearing cells; and
    determining an average motion of the pixels outside the current main rain-bearing cells with respect to at least one previous image;

and wherein the step of compiling a radar rainfall measurement chart includes:

estimating the accumulated precipitations due to the main rain-bearing cells as a function of levels of their interpolated pixels, taking into account an actual speed of each cell; and estimating the accumulated precipitations due to the pixels situated outside the main rain-bearing cells based on the determined average motion of the pixels outside the main rain-bearing cells.

5. The process according to claim 4, wherein the step of searching a current image for main rain-bearing cells includes:

selecting a restricted number of pixels of the current image, each of the restricted number of pixels exhibiting a sizable level within the whole of the current image, searching for blocks of contiguous pixels from the restricted number of pixels and shape identifying the blocks of contiguous pixels to eliminate outlier blocks, creating a new list of rain-bearing cells from the blocks of contiguous pixels and from the identified shapes of the blocks of contiguous pixels, fitting the rain-bearing cells of the new list of rain-bearing cells with rain-bearing cells of at least one previous list and assigning a speed to each cell, and estimating a future displacement of each rain-bearing cell.

6. The process according to claim 1, wherein in the step of compiling a radar rainfall measurement chart the interpolation comprises a temporal resynchronizing of the radar pixels, taking into account an average time taken by rain to reach the ground based on an average altitude value of the pixels in connection with a radial distance from the area of terrain to a radar and within a radar elevation with which the area of terrain is observed by the radar.

7. The process according to claim 1, wherein the step of correcting a rainfall measurement chart comprises:

accumulating over the second chosen time interval individual true rainfall data from the rain gauges of the selected at least one sub-array, applying a statistical fit between the true rainfall data from the rain gauges and corresponding estimated rainfall data in the rainfall measurement chart, and correcting points of the rainfall measurement chart.

8. The process according to claim 7, wherein the statistical fit is a linear regression.

9. The process according to claim 1, wherein the step of correcting a rainfall measurement chart further comprises checking a correspondence between true rainfall data from at least some of the rain gauges not belonging to the selected at least one sub-array and corresponding rainfall data in the corrected rainfall measurement chart.

10. The process according to claim 1, wherein the step of providing dated local rainfall data via the rain gauges comprises transmitting true rainfall data to a processing station pertaining to an entity managing the rain gauges, wherein the step of sampling pixels of radar images comprises transmitting radar image data concerning the area of terrain to the processing station, wherein the steps of analyzing the succession of radar images, compiling a radar rainfall measurement chart, selecting at least one sub-array and correcting a rainfall measurement chart are undertaken at the processing station, and wherein the step of analyzing the succession of radar images comprises checking received radar images by comparing consecutive images.

* * * * *